Dec. 6, 1932.    F. H. SMITH ET AL    1,889,795
METHOD OF JOINING PIPES
Filed Dec. 4, 1928
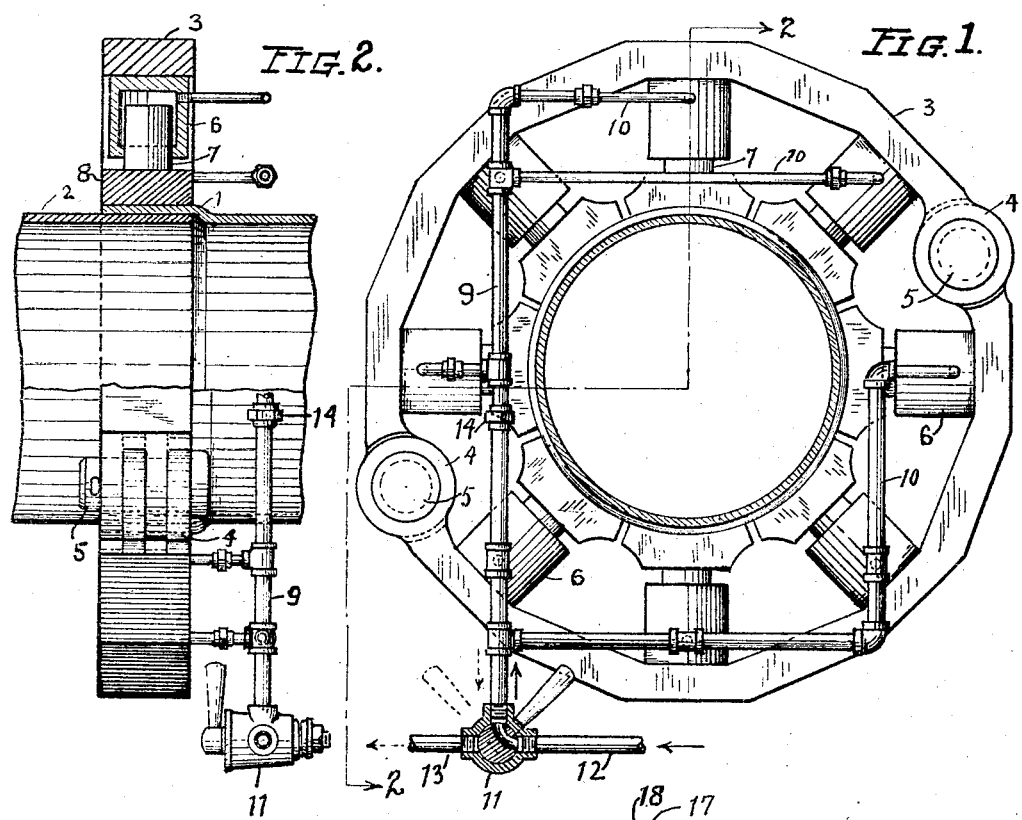
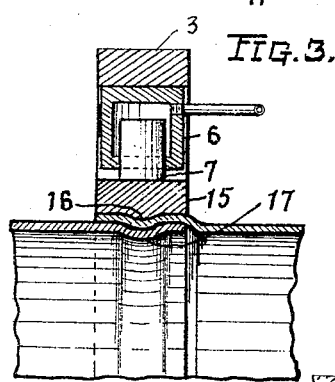
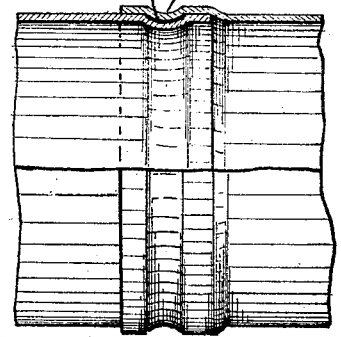
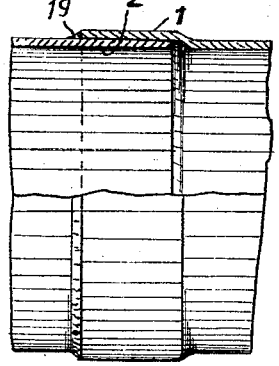
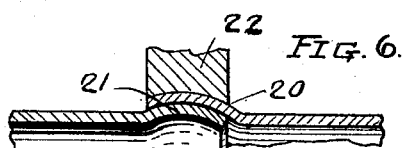
INVENTOR
HENRY A. STRINGFELLOW.
FRANK H. SMITH
By Evans & McCoy
ATTORNEYS Patented Dec. 6, 1932

1,889,795

UNITED STATES PATENT OFFICE

FRANK H. SMITH, OF PHILADELPHIA, PENNSYLVANIA, AND HENRY A. STRINGFELLOW, OF AKRON, OHIO

METHOD OF JOINING PIPES

Application filed December 4, 1928. Serial No. 323,750.

This invention relates to improvements in methods of joining pipes and more particularly to the building of pipe lines of steel tubing such as are employed for gas, oil, water or any fluid or vapor line.

In our copending application Serial No. 304,827, filed Sept. 13, 1928, there is disclosed a method of joining pipes by heating the bell of one pipe to expand the same sufficiently to receive the spigot of an adjoining pipe, inserting the spigot of the latter pipe into the bell of the first pipe and permitting the bell to cool and shrink on the spigot within the same.

The present invention involves the production of a similar joint without the application of heat and has for an object to provide a method of making a fluid tight joint by mechanically shrinking the bell of one pipe on the spigot of another.

A further object is to provide a method of making a shrunk joint which permits relatively large manufacturing tolerances with respect to the diameters and roundness of the pipe ends to be joined.

A further object is to provide a method of joining pipes by which a radial pressure is set up in the joint between the contacting surfaces of the pipe ends so that the pipe ends may be easily welded together if desired.

With the above and other objects in view, the invention may be said to comprise the method and apparatus as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of this specification:

Figure 1 is a plan view of the mechanical pipe shrinking device employed in making the joint.

Fig. 2 is a section taken on the line indicated at 2—2 in Fig. 1.

Fig. 3 shows a modified form of pressure applying head by which a circumferential groove may be formed in the overlapping pipe walls.

Fig. 4 is a detail view showing a joint formed by the method of the present invention and having a packing interposed between the pipe ends.

Fig. 5 is a detail view showing a joint welded subsequent to the shrinking operation.

Fig. 6 is a fragmentary sectional view showing another form of joint which may be made by the method of the present invention.

Referring to the accompanying drawing, the steel tubing to be joined is formed with a bell 1 at one end and a spigot 2 at the opposite end, the bell having an internal diameter slightly greater than the external diameter of the spigot so that the spigot can be readily inserted into the bell. The difference in the diameters of the bell and spigot may be sufficient to enable the spigot to be inserted in the bell even though there be minor variations from the standard size or slight variations from true roundness due to imperfections in the manufacturing process. In other words, sufficient manufacturing tolerances may be permitted so that special finishing operations on the bell and spigot are not required. In making the joint, the spigot of one pipe is inserted into the bell of the adjoining pipe and pressure is exerted mechanically on the bell throughout its circumference to squeeze it to a smaller diameter and force it inwardly upon the spigot, the shrinkage being sufficient to set up internal stresses in the spigot which create a relatively great radial outward pressure to be exerted upon the internal surface of the bell.

The shrinking of the bell is preferably accomplished by means of a fluid pressure device which consists of a ring 3 which is formed of detachable sections, the ends of the sections of the rings being provided with inter-fingering knuckles 4 which are apertured to receive hinged pins 5. When the sections are fitted together and secured by the hinge pins 5, a rigid ring is formed. Secured upon the interior of the ring 3, there are a series of fluid pressure cylinders 6 which have inwardly projecting pistons 7, each of which is provided with an arcuate head 8 formed to engage the outer surface of the bell.

The heads 8 are spaced apart slightly in order to permit the inward movement necessary to shrink the bell to the desired diameter. Pressure is supplied to the cylinders through a pipe 9 which has branches 10 leading to the various cylinders and a fluid under pressure, preferably a liquid, is admitted to the pipe 9 or exhausted therefrom by means of a valve 11 which controls the flow of fluid under pressure from a pressure pipe 12 and the exhaust of pressures from the cylinders through an exhaust pipe 13. The pipe 12 may be connected in any suitable manner with a source of fluid under pressure which may be admitted simultaneously to all the cylinders when communication is established between the pipes 9 and 12 by means of the valve 11. In order to facilitate the removal of the shrinking device from the pipe after the joint is formed, the pipe 9 is formed in sections with a coupling 14 substantially midway between its ends so that when one of the hinge pins 5 is removed, the two sections of the ring are free to swing about the remaining hinge pin as a pivot to open up the ring and permit it to be lifted away from the pipe.

If desired, the pressure applying heads may be formed to press a circumferential groove in the overlapping walls of the joint. As shown in Fig. 3, a head 15 is provided with a longitudinal central rib 16. It will be apparent that if all of the pressure applying heads are provided with such a rib, a circumferential groove such as indicated at 17 in Figs. 3 and 4 will be formed in the overlapping walls of the bell and spigot.

For low pressure pipe lines, the joint formed by the shrinking operation will be sufficiently tight, but for high pressure lines, it is desirable to insure a perfectly fluid tight joint either by means of packing between the bell and spigot or by means of a circumferential weld joining the bell and spigot. The joint may be packed by securing a relatively thin packing ring 18 upon the spigot prior to its insertion in the bell. The shrinking operation causes the packing to be tightly compressed between the bell and spigot. Such a packing is shown in Fig. 4 of the drawing in which a packing ring 18 is shown interposed between the grooved portions of the bell and spigot.

The shrunk joint of the present invention is very easily welded for the reason that there is radial pressure between the surfaces of the bell and spigot throughout the circumference of the joint and the two pipes are rigidly held against relative movements. It is therefore unnecessary to provide any means for holding the pipes during the welding operation and the welding operation can be easily and quickly performed.

In Fig. 5 of the drawing, the end of the bell is shown welded to the surface of the spigot by means of a circumferential weld 19.

In Fig. 6 of the drawing, there is shown a joint in which the bell 20 and spigot 21 are both of spherical contour, the pressure applying heads 22 being provided with concave engaging faces which are of spherical contour so that when the hydraulic pressure is applied, both the bell and spigot are drawn to spherical form.

In this joint, as well as in the others previously illustrated, the spigot exerts an outward radial pressure on the bell so that the pipe ends are firmly held together, but, by reason of the spherical shape of the spigot and bell, the spigot may be caused to slip within the bell to permit the pipes to be disposed at an angle one to the other, as may be desirable in laying pipe in the field. In other words, the bell and spigot form a tight ball and socket joint permitting angular adjustment of the pipes prior to the welding operation, the contacting surfaces of the bell and spigot being under radial pressure throughout so that they are rigidly held together during the welding operation.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What we claim is:

1. The herein described method of joining conduit pipes which consists in forming successive joints of the conduit by inserting the spigot of one pipe into the bell of another, and shrinking the bell onto the spigot by external pressure applied simultaneously throughout the circumference and substantially throughout the length of the bell.

2. The herein described method of joining conduit pipes which consists in inserting the spigot of one pipe into the bell of another, applying pressure externally to the bell and simultaneously throughout the circumference thereof to shrink the same onto the spigot, and simultaneously pressing a circumferential groove in the contacting walls of the bell and spigot.

In testimony whereof we affix our signatures.

FRANK H. SMITH.
HENRY A. STRINGFELLOW.